Oct. 23, 1923.
W. C. GARWOOD
1,471,395
AUTO LAMP DIMMER ATTACHMENT
Filed Oct. 11, 1921    2 Sheets-Sheet 1
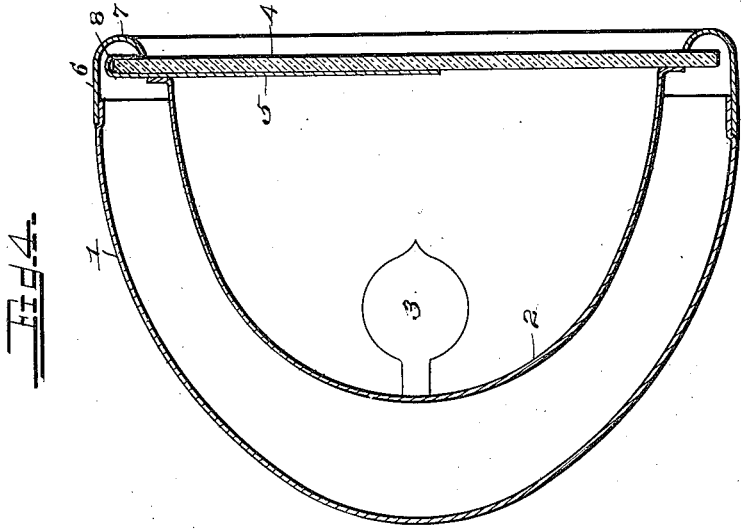
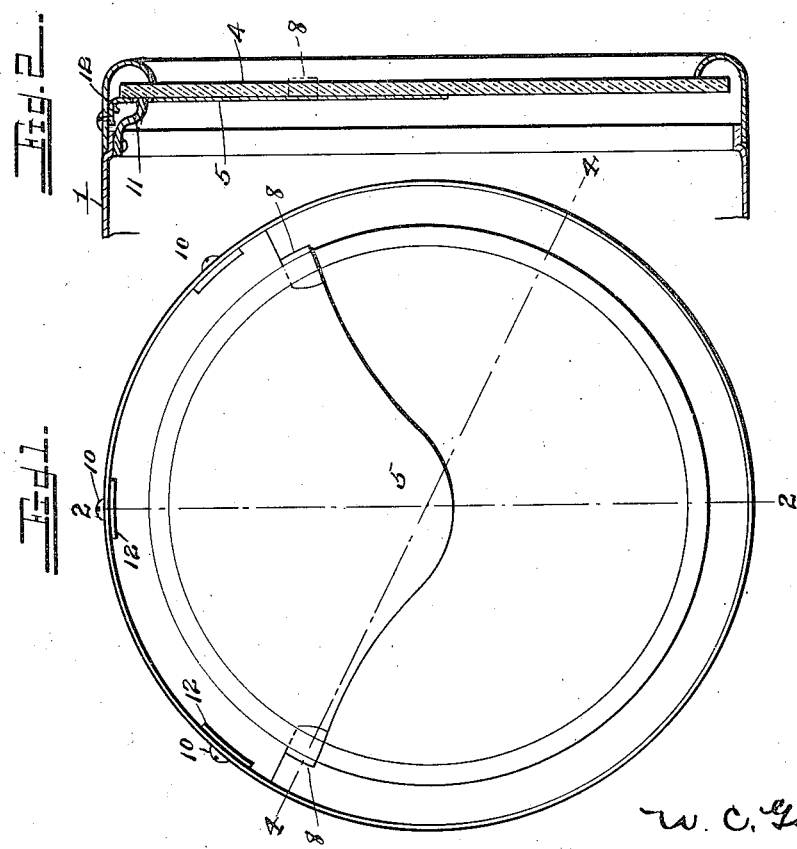
Inventor
W. C. Garwood.
By Robert H. Young.
Attorney Oct. 23, 1923.
W. C. GARWOOD
AUTO LAMP DIMMER ATTACHMENT
Filed Oct. 11, 1921   2 Sheets-Sheet 2
1,471,395
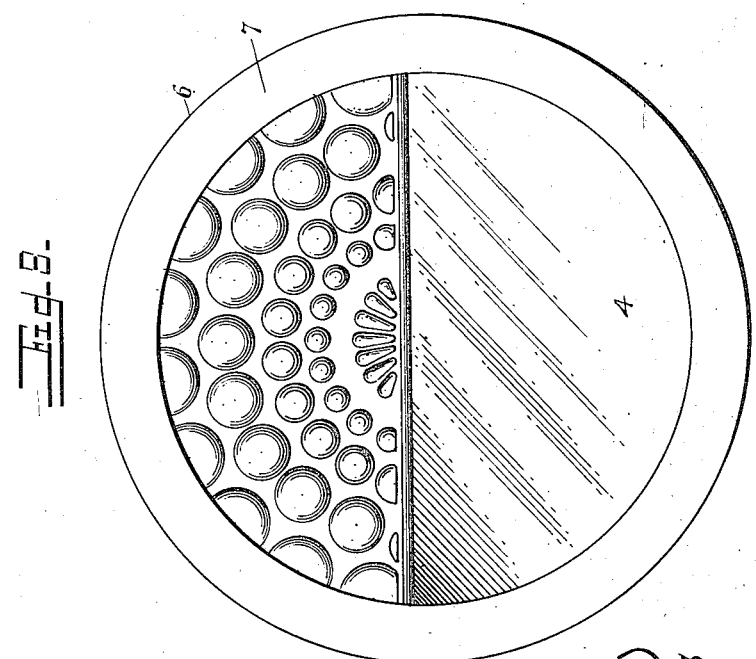
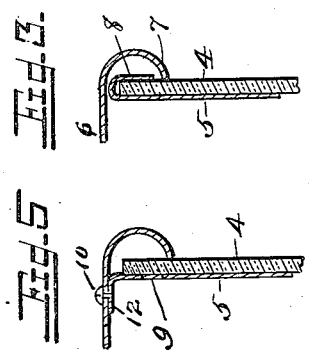
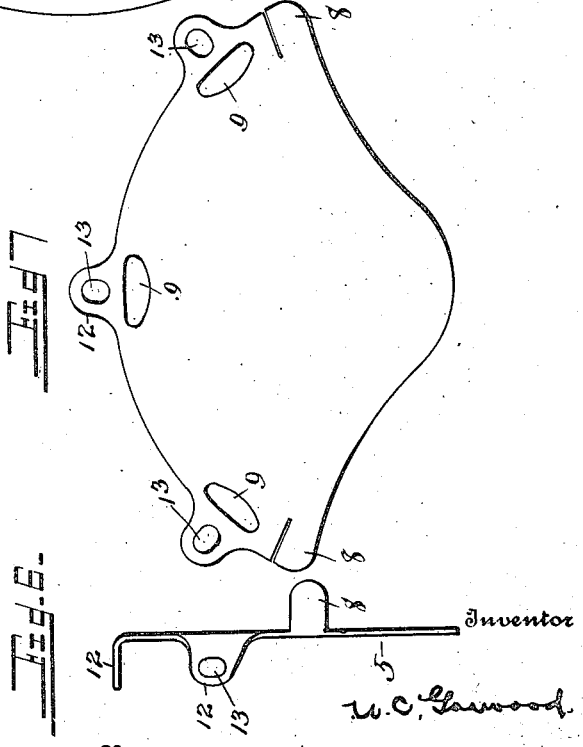

Patented Oct. 23, 1923.

1,471,395

UNITED STATES PATENT OFFICE.

WILLIAM C. GARWOOD, OF DAYTON, OHIO.

AUTO LAMP-DIMMER ATTACHMENT.

Application filed October 11, 1921. Serial No. 506,987.

*To all whom it may concern:*

Be it known that I, WILLIAM C. GARWOOD, a citizen of the United States, residing at Dayton, in the county of Montgomery and State of Ohio, have invented certain new and useful Improvements in Auto Lamp-Dimmer Attachments, of which the following is a specification.

This invention relates in general to fixtures in automobile headlights, and more specifically to a dimming attachment therefor. Due to the fact that bright lights are essential in operating a vehicle in the dark, many anti-glare devices have been proposed for the purpose of preventing the projection of such a glaring light that will tend to blind an approaching pedestrian or vehicle operator. These anti-glare devices usually consist of a means for deflecting the rays of light towards the ground or the provision of a lens so constructed that it breaks up the light rays, thus preventing a glaring light.

These devices, while proficient, are often comparatively expensive due to the series of prismatic surfaces within the lens, necessary for their proper functioning. Breakage of such a lens thus involves the expenditure necessary for the purchase of a new lens of such a type that will be the equivalent of a glass cover and a light refractor combined. It is therefore proposed to provide an anti-glare device which will be cheap to manufacture and capable of being detachably connected to the headlight supporting structure in conjunction with a plain glass lens. The breakage of such a plain glass lens will only necessitate the replacement of the glass itself as the anti-glare device may be made of less easily fractured material and may be again used in conjunction with the glass lens.

With the foregoing and other objects in view, which appear as the description proceeds, the invention resides in the combination of parts and in the details of construction hereinafter described and claimed, it being understood that changes in the precise embodiment of the invention herein described, may be made within the scope of what is claimed, without departing from the spirit of the invention, the specific embodiment of which is illustrated in the attached drawings in which:

Figure 1 is a rear elevation of the dimmer and the manner of attachment to the main lens.

Figure 2 is a section taken along line 2—2 of Figure 1.

Figure 3 is a detailed view of the relative position of the retaining lip of the lamp housing with the main lens.

Figure 4 is a section taken along line 4—4.

Figure 5 is a detailed view showing the relative position of the retaining rim, the main lens, the dimmer and its forwardly bent main lens engaging flange.

Figure 6 is a side view of the dimmer lens alone showing the position of the three rearwardly bent flanges and the two forwardly bent flanges.

Figure 7 is a front elevation of the dimmer attachment.

Figure 8 is a front elevation of the dimmer attachment provided with an embossed or molded surface.

Referring more particularly to the drawings 1 represents the lamp housing provided with the usual reflector 2 and bulb 3. A suitable retaining rim 6 is provided with an inturned flange 7 adapted to encircle the outer edge of the circular glass plate 4, and press inwardly against the outer face thereof. An anti-glare or dimmer attachment 5 is arranged behind the glass plate 4 and is held in place by means of a bent over flange 8, on the dimmer attachment 5, engaging the outer edge of the glass closure 4 and pressing inwardly on the outer face thereof. The flange 8 of the dimmer attachment 5 is fitted between the edge of the glass closure 4 and the retaining rim 7 and its inturned flange 7. Two of the flanges 8 are provided, one on either extremity of the arc of the dimmer attachment 5.

In addition to this dimmer retaining means, there is also provided a plurality of flanges 12 adapted to extend rearwardly of the dimmer and are provided with apertures 13 for receiving rivets 10, for the purpose of holding the dimmer in its proper place.

As shown more clearly in Figures 3 and 4 there is provided adjacent each of the flanges 12 an aperture 9 for the purpose of allowing the retaining lip 11 of the lamp housing to engage the rear surface of the glass closure 4 without contacting with the celluloid dimmer 5 and cause it to buckle under the pressure. The dimmer attachment may be made of celluloid, mica, or other suitable material so treated that it will resist the maximum heat evolved by a lighted electric bulb. The contour or periphery of the dimmer attachment may be of any size or shape as long as its arc coincides with that of the front glass. The preferred contour of the dimmer, however, is that of a semi-circle. The dimmer may for purposes of refracting light rays be colored or suitably embossed, molded or otherwise provided with an irregular surface.

Thus it will be seen by the foregoing description that there is provided a dimmer attachment capable of being easily attached, detached and replaced, which may be used in conjunction with an ordinary inexpensive plain glass closure.

Having thus described my invention, I claim:

In a headlight, a lens retaining rim provided with rivets, a lamp housing having retaining lips, a plain glass closure, an auxiliary celluloid dimmer attachment provided with rearwardly extending apertured flanges adapted to be engaged by rivets in said retaining rim, the face of said dimmer attachment being provided with apertures to receive said forwardly extending retaining lips on said lamp housing, said dimmer attachment being also provided with forwardly extending flanges adapted to engage the outer edge of said rim and press inwardly against the outer face thereof, said dimmer attachment being adapted to refract the rays of said headlight.

In testimony whereof I have affixed my signature.

WILLIAM C. GARWOOD.